(12) United States Patent
Heath et al.

(10) Patent No.: US 8,322,662 B2
(45) Date of Patent: Dec. 4, 2012

(54) CLEVIS HANGER AND METHOD OF INSTALLING THE CLEVIS HANGER

(75) Inventors: Richard W. Heath, Yorba Linda, CA (US); Dallas M. Dworak, Jr., Redlands, CA (US)

(73) Assignee: Cooper B-Line, Inc., Highland, IL (US)

( * ) Notice: Subject to any disclaimer, the term of this patent is extended or adjusted under 35 U.S.C. 154(b) by 305 days.

(21) Appl. No.: 12/502,803

(22) Filed: Jul. 14, 2009

(65) Prior Publication Data
US 2010/0006729 A1   Jan. 14, 2010

Related U.S. Application Data

(60) Provisional application No. 61/080,601, filed on Jul. 14, 2008.

(51) Int. Cl.
*E21F 17/02* (2006.01)

(52) U.S. Cl. ............................................ 248/62; 248/58

(58) Field of Classification Search .................... 248/58, 248/61, 62, 63, 74.5; D8/380
See application file for complete search history.

(56) References Cited

U.S. PATENT DOCUMENTS

| 2,466,247 | A | * | 4/1949 | Land | 248/62 |
| 2,671,625 | A | * | 3/1954 | Buckley | 248/58 |
| 4,004,767 | A | * | 1/1977 | Chilton | 248/58 |
| 4,019,705 | A | * | 4/1977 | Habuda et al. | 248/58 |
| D330,672 | S | * | 11/1992 | Wilkinson, III | D8/373 |
| 6,138,960 | A | * | 10/2000 | Carbonare et al. | 248/62 |
| 6,505,796 | B1 | * | 1/2003 | Roth | 248/62 |
| 2003/0047649 | A1 | * | 3/2003 | Miescher et al. | 248/58 |
| 2006/0175471 | A1 | * | 8/2006 | Opperthauser | 248/62 |

* cited by examiner

*Primary Examiner* — Gwendolyn W Baxter
(74) *Attorney, Agent, or Firm* — Thorpe North & Western LLP

(57) ABSTRACT

A clevis hanger has an upper strap and a lower strap. The upper strap can be supported by a hang rod or the like. The lower strap and the upper strap can be snapped open and snapped closed such that the lower strap can be secured to the upper strap without additional hardware.

7 Claims, 13 Drawing Sheets

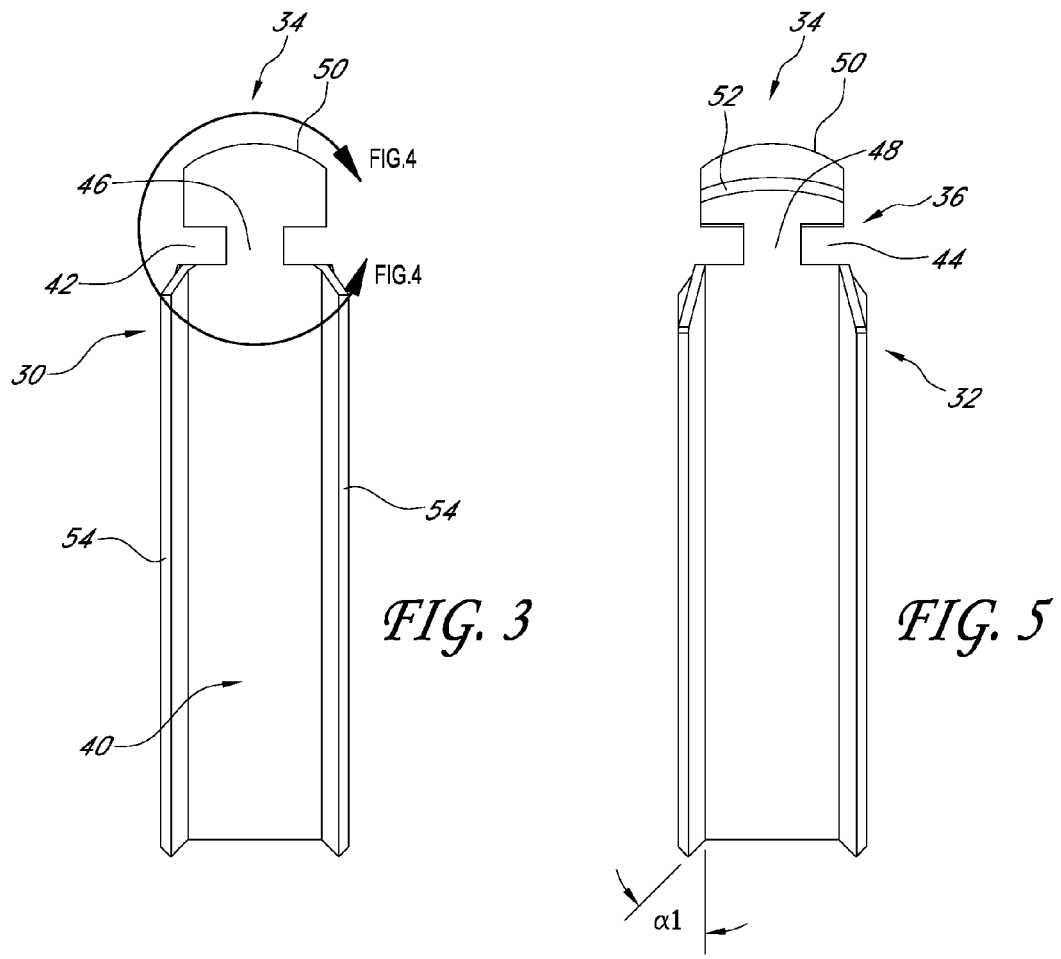
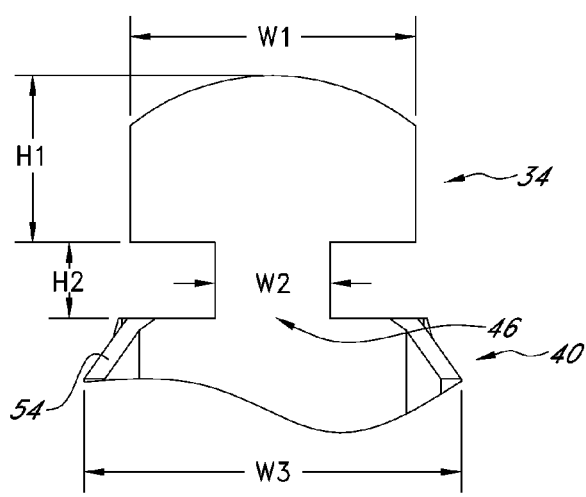

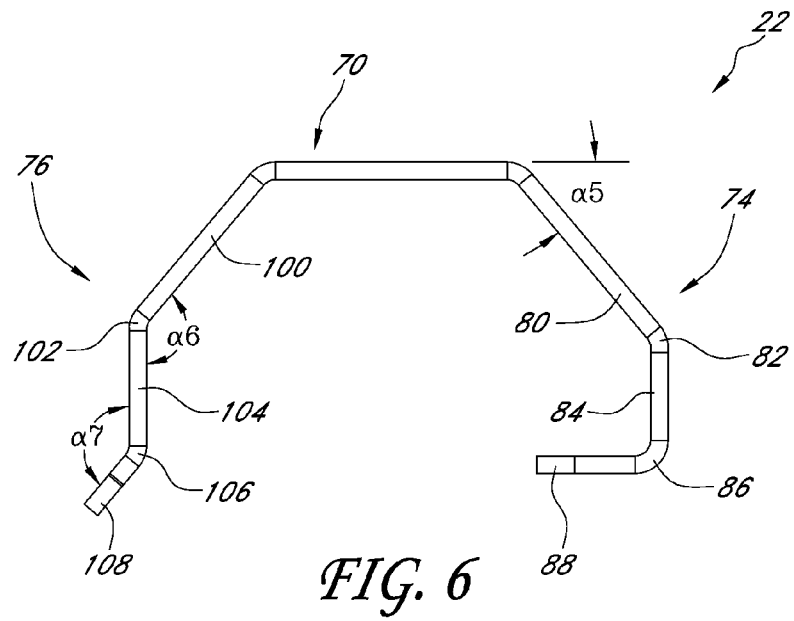
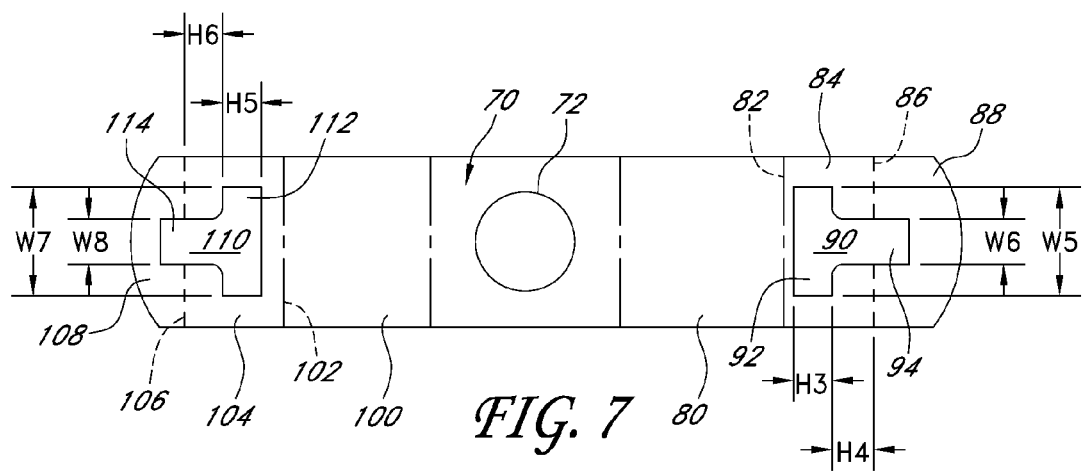
FIG. 6
FIG. 7

CLEVIS HANGER AND METHOD OF INSTALLING THE CLEVIS HANGER

CROSS-REFERENCE TO RELATED APPLICATIONS

This application claims priority under 35 U.S.C. §119(e) to U.S. Provisional Patent Application No. 61/080,601, which was filed on Jul. 14, 2008 and which is hereby incorporated by reference in its entirety.

BACKGROUND OF THE INVENTION

1. Field of the Invention

The present invention generally relates to clevis hangers for supporting cable, conduit and/or pipe from a ceiling or other overhead support structure.

2. Description of the Related Art

Conduit installed along ceilings and the like is often supported by a series of clevis hangers connected to support rods hanging downward from the ceiling. Each clevis hanger typically includes a lower U-shaped hanger member that supports the conduit and an upper hanger member that connects the clevis hanger to the support rod. The lower and upper hanger members feature arms that include openings. The openings, when horizontally aligned, receive a fastener to connect the two members together.

In one method of assembling the clevis hanger and installing the conduit, the lower U-shaped hanger member is fitted onto the conduit and raised with the conduit above an installer's head to mate with the upper hanger member, which is already connected to the support rod. Due to the poor lighting conditions and unfavorable positioning of the installer with respect to the clevis hanger, it is usually difficult for the installer to align the openings of the lower and upper hanger members so that the fastener may be easily inserted through the openings to connect the two members together.

In another installation method, the lower hanger member is connected to the upper hanger member and the clevis hanger assembly is connected to the support rod. The conduit then is fed through the clevis hanger. Since the lower hanger member is typically free to rotate about a longitudinal axis extending through the fastener, the conduit often causes the lower hanger member to rotate in the direction that the conduit is being fed as the conduit contacts the lower hanger member. This is particularly a problem when a conduit is fed through the clevis hanger at an angle from a location below the clevis hanger. As the lower hanger member rotates away from its conduit supporting position, the opening through which the conduit is fed is reduced, thus making it difficult to push the conduit through the clevis hanger without manually holding the lower hanger member in its conduit supporting position. Furthermore, as the conduit is fed through the clevis hanger, rotation of the lower hanger member causes a sharp outer edge of the lower hanger member to scrape against the conduit. The scraping of the outer edge of the lower hanger member along the conduit as it is fed through the clevis hanger not only damages a conduit formed from a plastic material, it makes installation more difficult and puts additional stress on the support rod. The rotation of the lower member also makes adjustment of the clevis hanger to support a conduit at a specific height and angle difficult due to the variability in height caused by the angled position of the lower hanger member.

SUMMARY OF THE INVENTION

Accordingly, some features, aspects and advantages of the embodiments of the present invention address one or more of the problems described above. Through the use of a snap-open and snap-closed configuration, the conduit can be placed into each clevis hanger with a lower strap connected to one side of an upper strap and then the lower strap can be snapped into a closed position. Alternatively, the conduit can be placed into the lower strap and the lower strap can have a first end inserted into the upper strap and then a second end of the lower strap can be snapped into a closed position. Such a configuration simplifies installation and removes the need for threaded fasteners and the accompanying extra labor and parts.

One aspect of the present invention relates to a clevis hanger comprising a lower strap and an upper strap. The lower strap comprises a first end and a second end. The first end comprises a first tab and the second end comprises a second tab. A main body is positioned between the first tab and the second tab. The main body comprises a bent lower portion and a pair of generally parallel arms extending upward from the bent lower portion. The pair of generally parallel arms comprises a first arm and a second arm. The first arm being is separated from the first tab by a first neck region defined by at least one recess and the second arm is separated from the second tab by a second neck region defined by at least one recess. The lower strap is generally symmetrical about a transverse generally vertical center plane. The upper strap comprises a pair of leg portions. The leg portions are spaced apart and are generally symmetrical about the transverse generally vertical plane. The leg portions comprise a first leg portion and a second leg portion. The first leg portion comprises a first two part opening and the second leg portion comprises a second two part opening. The first tab is receivable within the first two part opening and the second tab is receivable within the second two part opening.

Another aspect of the present invention involves a clevis hanger comprising a lower strap and an upper strap. The lower strap comprises a bent lower portion and a pair of generally parallel arms extending upward from the bent lower portion. The lower strap is generally symmetrical about a transverse generally vertical center plane. The upper strap comprises a pair of leg portions. The leg portions are spaced apart and are generally symmetrical about the transverse generally vertical plane. At least a portion of at least one of the leg portions is generally adjacent to at least a portion of at least one of the generally parallel arms. The leg portions each comprises a two part opening and each of the generally parallel arms comprises a tab. The tabs are receivable within the openings.

A further aspect of the present invention involves a clevis hanger comprising a lower strap and an upper strap. The lower strap comprising a bent lower portion and a pair of generally parallel arms extending upward from the bent lower portion. The lower strap is generally symmetrical about a transverse generally vertical center plane. The upper strap comprises a pair of leg portions. The leg portions are spaced apart and are generally symmetrical about the transverse generally vertical plane. At least a portion of the leg portions is generally adjacent to at least a portion of the generally parallel arms. Means are provided for connecting the lower strap to the upper strap without the use of any additional components.

An aspect of the present invention also involves a method of installing a clevis hanger used to support a conduit. The method comprises connecting an upper strap to a hanging rod, the upper strap comprising a first opening, inserting a first tab of a lower strap into the first opening, allowing the lower strap to hang from the upper strap, pivoting the lower strap upward about an axis generally parallel to a longitudinal axis of the supported conduit and inserting a second tab of the lower strap into a second opening of the upper strap to secure the conduit in the clevis hanger.

BRIEF DESCRIPTION OF THE DRAWINGS

These and other features, aspects and advantages of the present invention now will be described with reference to the following drawings, which are intended to illustrate and not to limit the invention.

FIG. 3 is a side view of the lower strap of the embodiment of FIG. 1.

FIG. 4 is an enlarged view of a tab of the lower strap taken along the line FIG. 4-FIG. 4 in FIG. 3.

FIG. 5 is another side view of the lower strap of the embodiment of FIG. 1.

FIG. 6 is a front view of an upper strap of the embodiment of FIG. 1.

FIG. 7 is a view of the upper strap of the embodiment of FIG. 1 prior to any bending operations.

DETAILED DESCRIPTION OF THE PREFERRED EMBODIMENT

FIGS. 1-7 illustrate a first embodiment of a snap-open and snap-closed clevis hanger 20 that is arranged and configured in accordance with certain features, aspects and advantages of the present invention. The clevis hanger 20 comprises an upper strap 22 and a lower strap 24. As will be explained in greater detail below, in some embodiments, the lower strap 24 is connected to the upper strap 22 without the use of any threaded fasteners or the like. For this reason, installation can be greatly simplified. Moreover, the lower strap 24 is interlocked with the upper strap 22 in a simplified manner such that installation can be performed easily without undue complications. In the preferred embodiments, the interlocking assemblies described herein provide configurations that allow the lower strap and the upper strap to be connected without any further components. While additional components can be added, if desired, such components are not necessary.

Figure 2:
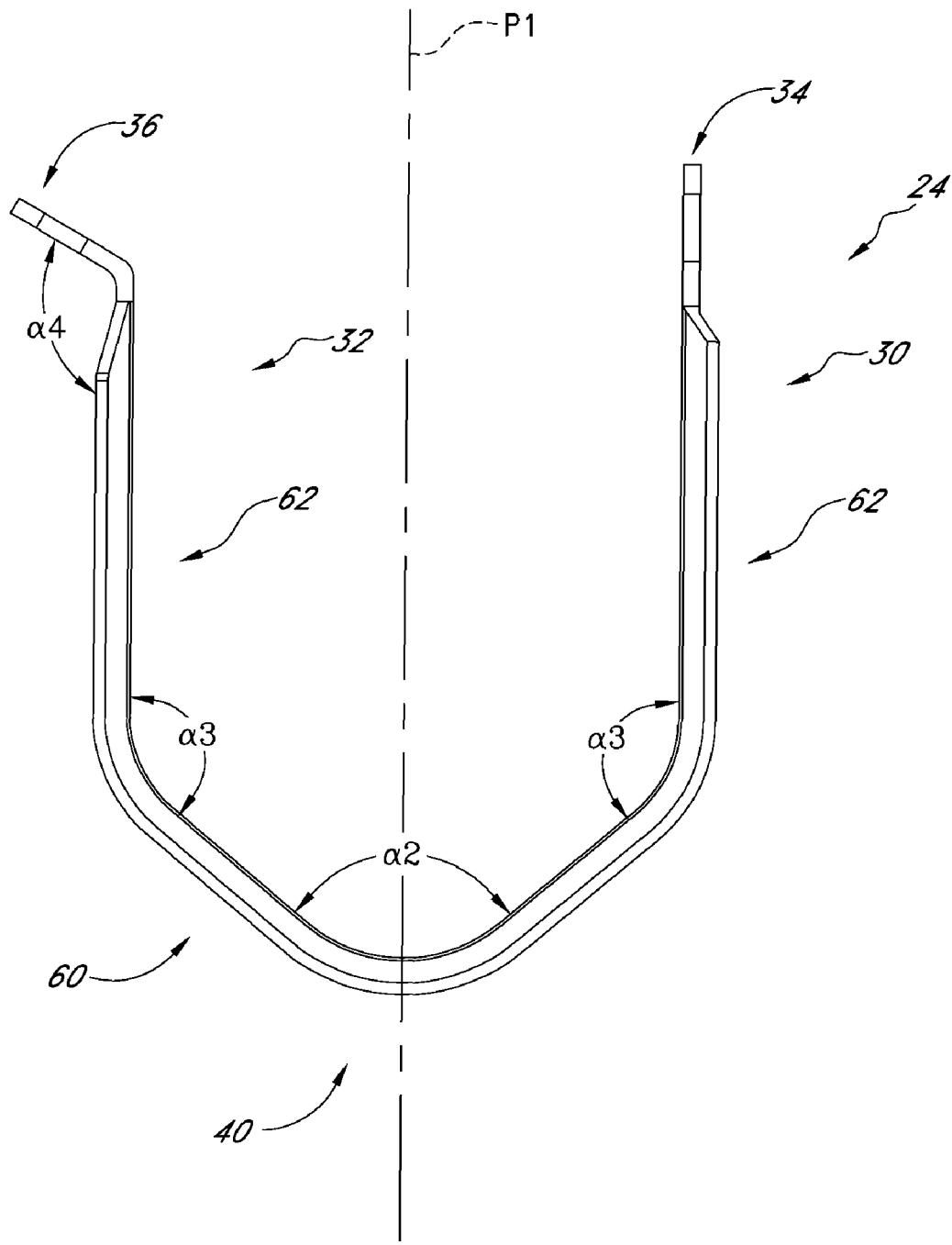
FIG. 2 is a front view of a lower strap of the embodiment of FIG. 1.
Figure 8:
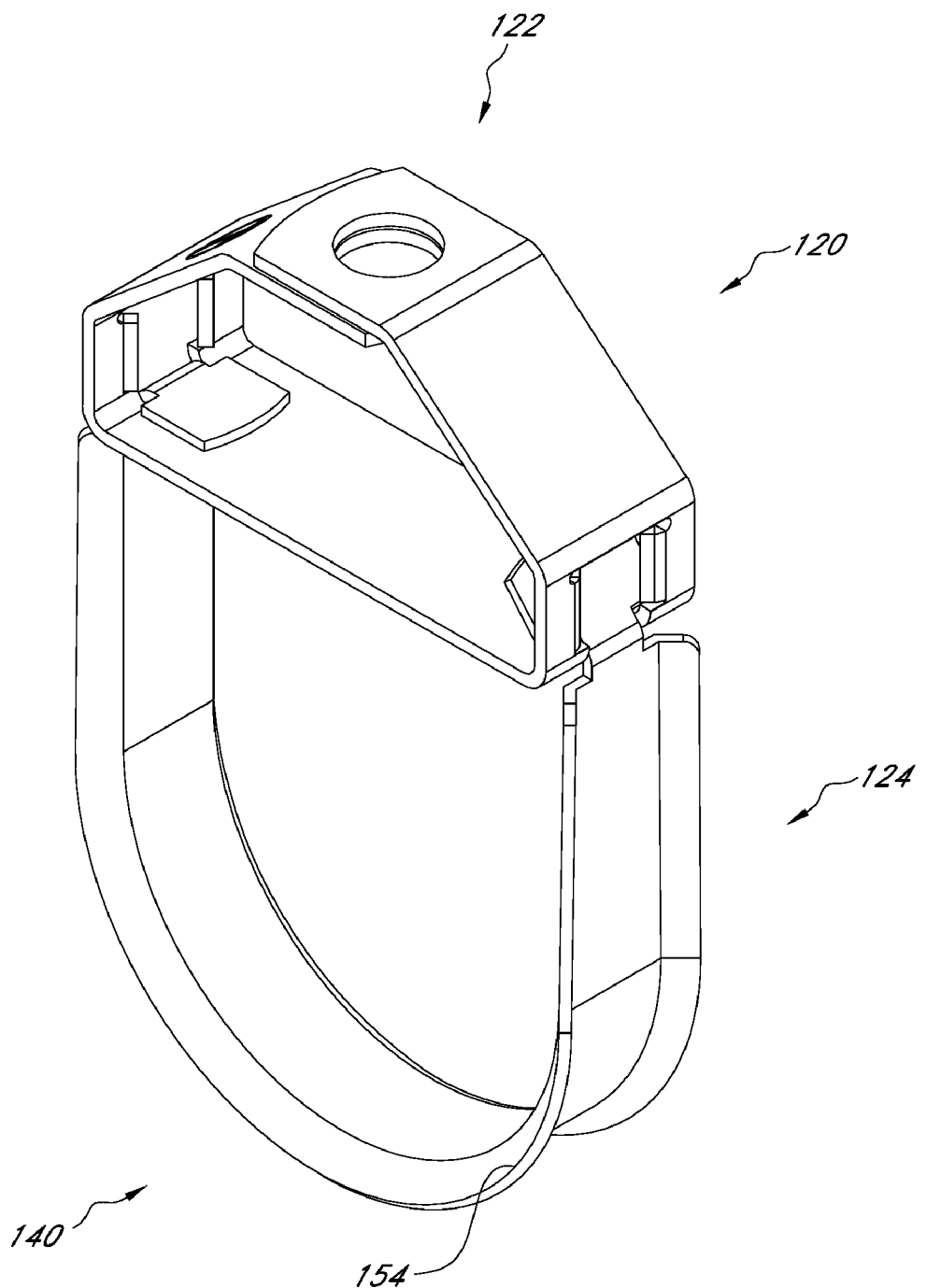
FIG. 8 is a perspective view of another embodiment of a snap-open and snap-closed clevis hanger.

With reference now to FIG. 2, the illustrated embodiment of the lower strap 24 comprises a generally monolithic construction. In other words, the lower strap 24 preferably is formed from a single strip of material. While other constructions are possible, the illustrated lower strap 24 is very cost effective.

The lower strap 24 comprises a first end 30 and a second end 32. As illustrated, the first end 30 comprises a first tab 34 and the second end 32 comprises a second tab 36. The tabs 34, 36 can have any suitable configuration. In the illustrated embodiment, the tabs 34, 36 are separated from a main body 40 by recesses 42, 44 respectively formed in the lower strap. Preferably, at least one recess 42 separates the first tab 34 from the first end 30 and at least one recess 44 separates the second tab 36 from the second end 32. The recesses 42, 44 preferably define neck regions 46, 48 of the T-shaped tabs 34, 36. Other configurations are possible.

The illustrated tabs 34, 36 comprise rounded ends 50, 52 respectively. While the illustrated tabs 34, 36 comprise rounded ends 50, 52, the ends 50, 52 can be squared or have any other suitable shape. The rounded ends 50, 52 are desired to remove sharp corners and to improve assembly. Moreover, the tabs 34, 36 preferably comprise an outer width W1 and the necks 46, 48 each comprise an outer width W2. Notably, the main body 40 also has an outer width W3. Preferably, the tab outer width W1 is smaller than the main body outer width W3 and larger than the neck outer width W2. Thus, W2<W1<W3. In some embodiments, the width of the neck W2 is about ⅓ of the width of the tab W1. Other configurations are possible. The tabs 34, 36 comprise a height H1 while the necks 46, 48 comprise a second height H2. In other words, the bottom of the tabs 34, 36 are spaced from the top of the main body 40 by the second height H2.

As illustrated, some embodiments the main body 40 of the lower strap 24 comprise rolled edges 54. The rolled edges 54 reduce the likelihood of the lower strap 24 scraping along a supported conduit or otherwise abrading the supported member. In addition, during installation, the rolled edges 54 allow the lower strap 24 to more easily slide along an outer surface of the supported conduit or the like without digging in or catching along the outer surface. Moreover, the rolled edges 54 also strengthen the lower strap 24 and improve its rigidity. Preferably, the edges 54 are bent to an angle α1 of about 45 degrees along substantially the entire main body 40. More preferably, the ends of the edges 54 proximate the first and second tabs 34, 36 are cut at an angle such that sharp edges are not formed at the ends of the edges 54.

With reference to FIG. 2, the lower strap 24 can be formed in a U-shaped configuration, a V-shaped configuration or some combination of the two. In the embodiment shown in FIG. 2, the lower strap 24 has a first portion 60 that is generally V-shaped. In some embodiments, the first portion 60 defines an inside angle α2 of about 100 degrees. Other angles also can be used. Two generally parallel leg portions 62 extend upward from the first portion 60 such that the illustrated lower strap 24 is generally U-shaped with a generally V-shaped bottom portion. Preferably, the two leg portions 62 are spaced apart from each other and are generally symmetrical about a transversely extending generally vertical plane P1. In some embodiments, the leg portions 62 and the adjacent portions of the first portion 60 define an inside angle α3 of about 130 degrees. Other angles also can be used. The illustrated construction results in the lower strap 24 defining an inside dimension W4 between the two leg portions 62. Also, the first portion 60, which has a generally V-shaped configuration, can be designed to accommodate conduits of various outside diameters (e.g., conduits having an outside diameter of between about ½ inch and about 1 inch and conduits having an outside diameter of between about 1¼ inches and about 2 inches). More particularly, the V-shaped configuration allows the lower strap 24 to be used with conduits or the like have a predetermined range of outer diameters.

The first tab 34 preferably is aligned with the corresponding leg portion 62 while the second tab 36 extends outward at an angle relative to the corresponding leg portion 62. In some embodiments, the second tab 36 and the leg portion 62 define an inside angle α4 of about 120 degrees. Other angles are possible.

Figure 1:
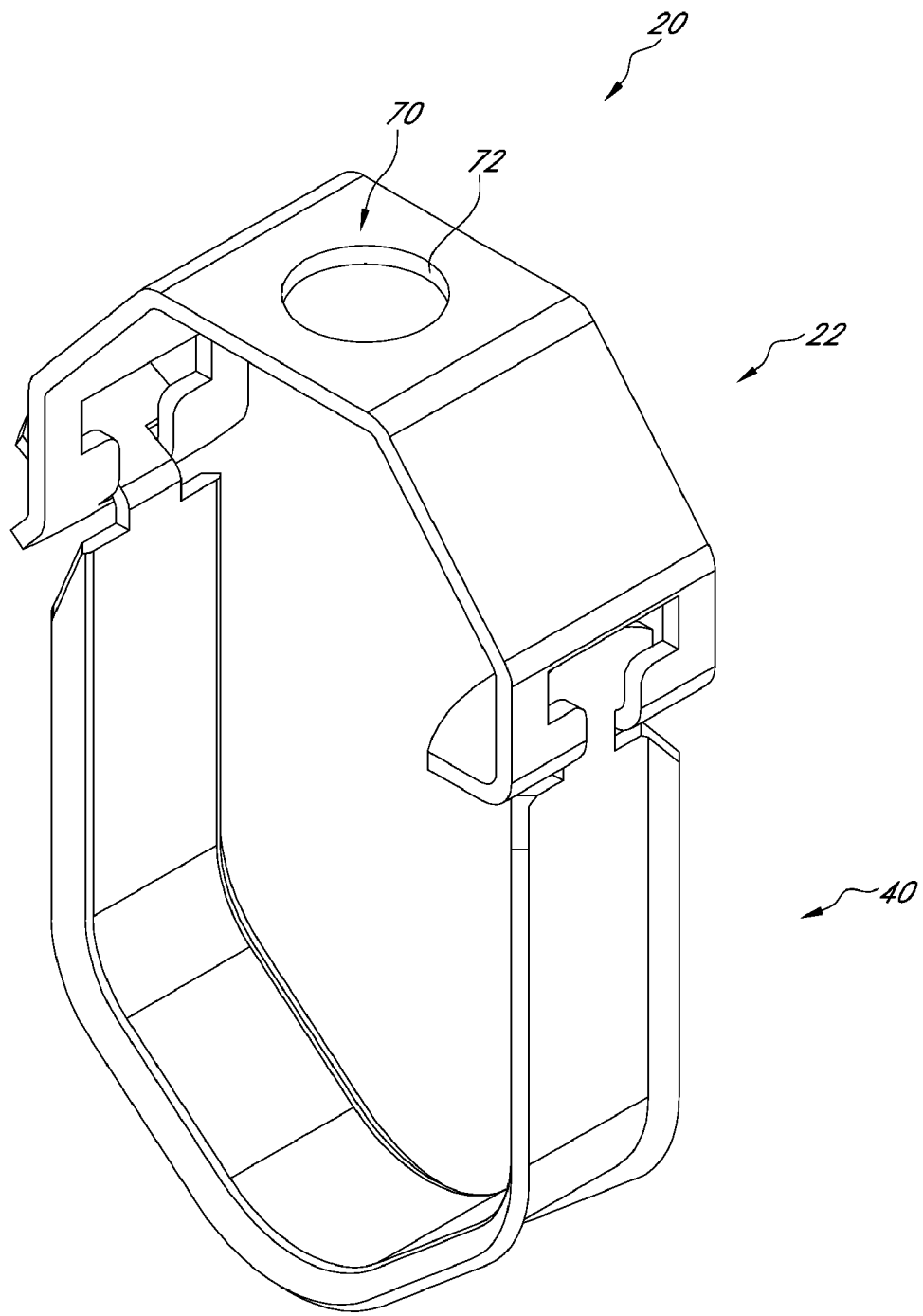
FIG. 1 is a perspective view of an embodiment of a snap-open and snap-closed clevis hanger.

With reference now to FIG. 6, the upper strap 22 can have an opened configuration such as that shown in the embodiment of FIG. 1 or the upper strap can have a generally closed configuration as will be discussed in more detail below. In the opened configuration, the upper strap comprises a generally horizontal upper portion 70. The upper portion 70 can comprise an aperture 72 or the like. The illustrated aperture 72 is generally circular but may have other configurations. The aperture 72 can accommodate a threaded rod or the like for supporting the upper strap 22. In some configurations, a captured nut (not shown) can be provided within the aperture 72.

A first leg portion 74 and a second leg portion 76 extend downward from the upper portion 70. The first leg portion 74 preferably extends downward at an angle α5 from the upper portion. In some embodiments, the angle α5 is about 50 degrees. The first leg portion 74 preferably comprises bends in two places. For example, the first leg portion 74 can comprise an upper part 80 that extends from the upper portion 70 to a first bend 82, a middle part 84 that extends from the first bend 82 to a second bend 86 and a lower part 88 that extends from the second bend 86. Preferably, the lower part 88 extends inward. In some configurations, the lower part 88 is generally parallel with the upper portion 70.

With reference to the detailed illustration (i.e., the view prior to performing any bending operations) of the upper strap 22, a first opening 90 preferably is formed in the lower part 88 and the middle part 84 of the first leg portion 74. In other words, a portion of the first opening 90 extends across the second bend 86 of the first leg portion 74. As illustrated, the first opening 90 preferably is generally T-shaped in configuration. A head portion 92 of the opening 90 is positioned between a post portion 94 of the opening 90 and the aperture 72. In other words, the head portion 92 is positioned toward a middle region of the unbent upper strap 22 relative to the post portion 94. In addition, the post portion 94 preferably is the portion of the opening 90 that bridges the second bend 86 of the first leg portion 74.

In the illustrated configuration, the head portion 92 of the first opening 90 defines an inside width W5 that is slightly larger than the width W1 of the first tab 34 while the neck portion 94 defines an inside width W6 that is slightly larger than the width W2 of the neck region 46 of the first tab 34. Preferably, the head portion 92 also defines an inside height H3 that is smaller than the height H1 of the first tab 34. In addition, in the illustrated configuration, the portion of the post portion 94 that is on the same side of the second bend 86 as the head portion 92 preferably defines a height H4 that is greater than the height H2 of the neck region 46 of the first tab 34.

The illustrated construction allows the first tab 34 to be inserted into the head portion 92 of the first opening 90 until the neck region 46 of the first tab 34 can be moved downward into the post portion 94 of the first opening 90. With the first tab 34 inserted into the first opening 90 and with the neck region 46 of the first tab 34 positioned within the post portion 94 of the first opening 90, the lower strap 24 can hang in an opened position below the upper strap 22. In some configurations, the lower strap 24 will hang open and allow easy insertion of any conduit desired to be retained by the illustrated hanger assembly 20.

The second leg portion 76 of the upper strap 22 also extends downward from the upper portion 70 of the upper strap 22. The illustrated second leg portion 76 comprises an upper part 100 that extends between the upper portion 70 and a first bend 102, a middle part 104 that extends between the first bend 102 and a second bend 106 and a lower part 108 with the second bend 106 being positioned between the middle part 104 and the lower part 108. In the illustrated configuration, the first bend 102 defines an inside angle α6 of about 140 degrees. Moreover, the lower part 108 preferably is bent outward and the second bend 106 preferably defines an inside angle α7 of about 140 degrees. Other configurations are possible.

With reference again to the detailed illustration of the upper strap 22, a second opening 110 preferably is formed in the lower part 108 and the middle part 104 of the second leg portion 76. In other words, a portion of the second opening 110 extends across the second bend 106 of the second leg portion 76. As illustrated, the second opening 110 preferably is generally T-shaped in configuration. A head portion 112 of the opening 110 is positioned between a post portion 104 of the opening 110 and the aperture 72. In other words, the head portion 112 is positioned toward a middle region of the unbent upper strap 22 relative to the post portion 114. In addition, the post portion 114 preferably is the portion of the opening 110 that bridges the second bend 106 of the second leg portion 76.

In the illustrated configuration, the head portion 112 of the second opening 110 defines an inside width W7 that is slightly larger than the width W1 of the second tab 36 while the neck portion 114 defines an inside width W8 that is slightly larger than the width W2 of the neck region 48 of the second tab 36. Preferably, the head portion 112 also defines an inside height H5 that is smaller than the height H1 of the second tab 36. In addition, in the illustrated configuration, the portion of the post portion 114 that is on the same side of the second bend 106 as the head portion 112 preferably defines a height H6 that is greater than the height H2 of the neck region 48 of the first tab 36.

Due to the outward bend direction of the second tab 36, the vertical leg portion 62 of the main body 40 of the lower strap 24 must be pressed inward in order for the second tab 36 to be inserted into the head portion 112 of the second opening 110. The outward bend of the lower part 108 of the second leg portion 76 of the upper strap 22 assists with the guiding of the end of the second tab 36 during the movement into the head portion 112 of the second opening. Once the second tab 36 has been aligned with and positioned within the head portion 112 of the second opening 110, pressure can be removed from the leg portions 62 of the lower strap 24 and the neck region 48 of the second tab 36 will be generally aligned with the middle part 84 of the second leg portion 76 such that the second tab 36 can move downward and the neck region 48 is received within the post portion 114 of the second opening 110.

In this manner, the lower strap 24 can be locked into engagement with the upper strap 22. As explained above, the first tab 34 is inserted from the outside of the first leg portion 74 of the upper strap 22 while the second tab 36 is inserted from the inside of the second leg portion 76 of the upper strap 22. Due at least in part to the configuration of the lower part 88 of the first leg portion 74 and the post portion 94 of the first opening 90, the first tab 34 is generally precluded from substantial vertical movement. Due at least in part to the outward bend of the second tab 36 and the generally vertical orientation of at least a portion of the post portion 114 of the second opening 110 as well as the sizing of the gap between the generally vertical legs 62 of the lower strap and the gap between the first and second leg portions 74, 76, the second tab is generally precluded from substantial lateral movement and requires compression between the generally vertical legs 62 to allow removal of the second tab 36 from the second opening 110. Thus, once assembled, compressive forces must be applied to the legs of the lower strap (or expansive forces must be applied to the legs of the upper strap) in order to separate the lower strap 24 from the upper strap 22.

With reference now to FIGS. 8-17, another hanger assembly 120 is illustrated therein. As with the embodiments of the hanger assembly 20 described above, the hanger assembly 120 is designed as a snap-open and snap-closed hanger assembly. The illustrated hanger assembly 120 comprises an upper strap 122 and a lower strap 124. As described above, the lower strap 124 can be connected to the upper strap 122 without the use of threaded fasteners or the like. Moreover, the lower strap 124 can be interlocked with the upper strap 122 in a manner that eases installation.

Figure 9:
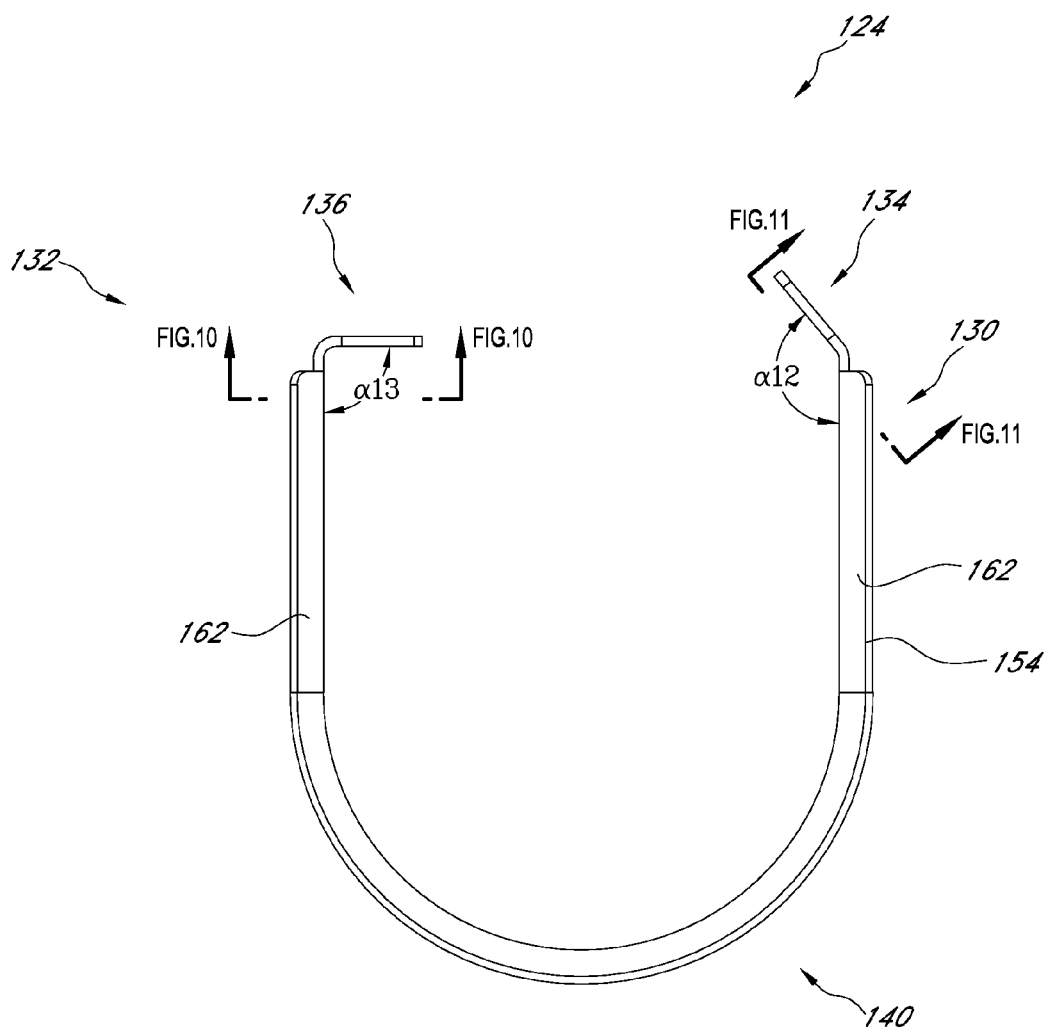
FIG. 9 is a front view of a lower strap of the embodiment of FIG. 8.
Figure 10:
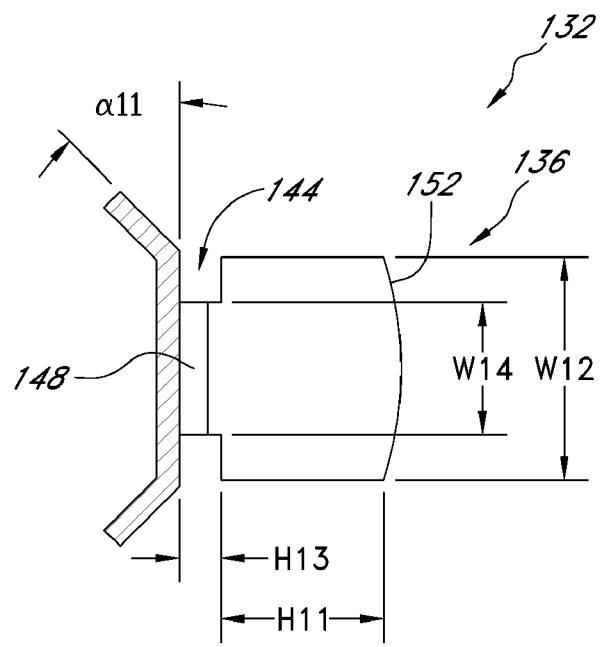
FIG. 10 is a sectioned view taken along the line FIG. 10-FIG. 10 in FIG. 9.
Figure 11:
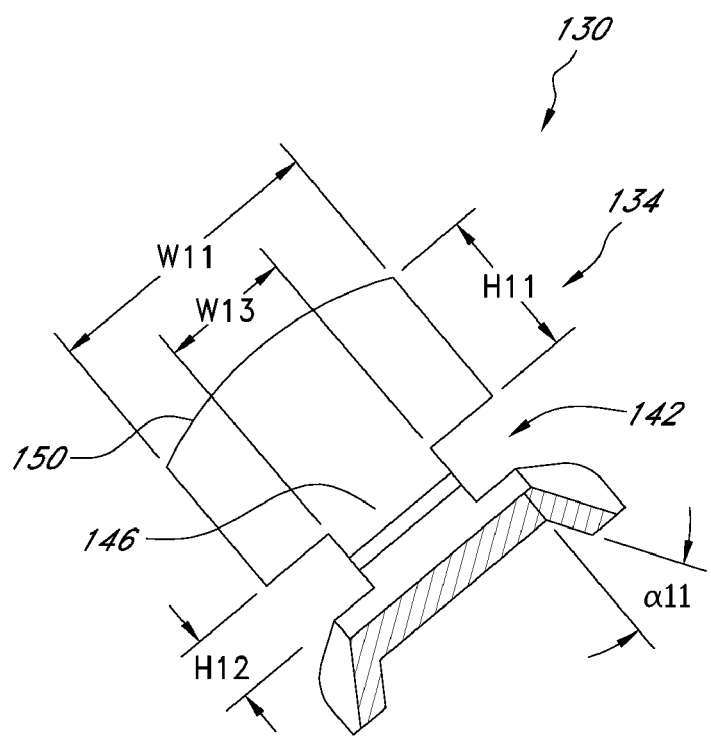
FIG. 11 is a sectioned view taken along the line FIG. 11-FIG. 11 in FIG. 9.
Figure 12:
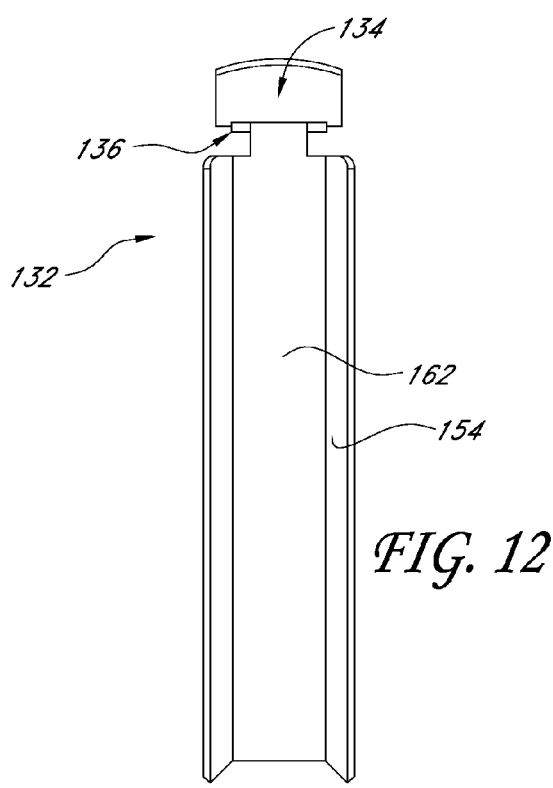
FIG. 12 is a side view of the lower strap of the embodiment of FIG. 8.
Figure 13:
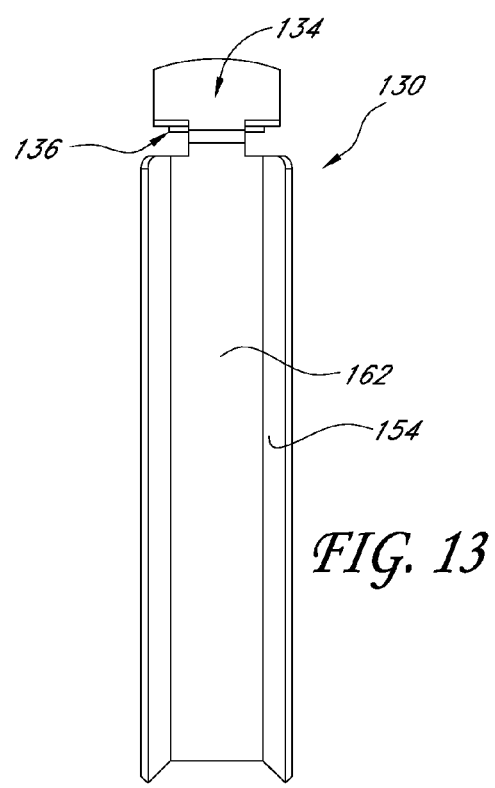
FIG. 13 is another side view of the lower strap of the embodiment of FIG. 8.

With reference to FIG. 9, the illustrated lower strap 124 preferably is formed from a single strip of material. The lower strap 124 comprises a first end 130 and a second end 132. As illustrated, the first end 130 comprises a first tab 134 and the second end 132 comprises a second tab 136. The tabs 134, 136 can have any suitable configuration. In the illustrated embodiment, the tabs 134, 136 are separated from a main body 140 by recesses 142, 144 respectively formed in the lower strap 124. The recesses 142, 144 preferably define neck regions 146, 148 of the T-shaped tabs 134, 136. Other configurations are possible. In some configurations, the neck region 146 of the first end 130 is slightly elongated relative to the neck region 148 of the second end 132.

The illustrated tabs 134, 136 comprise slightly rounded ends 150, 152 respectively. While the illustrated tabs 134, 136 comprise rounded ends 150, 152, one or more of the ends 150, 152 can be squared or have any other suitable shape. The rounded ends 150, 152 are desired to remove sharp corners and to improve assembly. Moreover, the tabs 134, 136 each comprise an outer width W11, W12 and the necks 146, 148 each comprise an outer width W13, W14. Notably, the main body 140 also has an outer width W15. Preferably, the tab outer width W11, 12 is smaller than the main body outer width W15 and larger than the neck outer width W143, W14. Thus, W13<W11<W15 and W14<W12<W15. In some embodiments, the width of the neck W14 is slightly larger than about ½ of the width of the tab W12. Other configurations are possible.

The tabs 134, 136 comprise a height H11 while the neck 146 comprises a second height H12 and the neck 148 comprises a third height H13. In other words, the bottom of the tabs 134, 136 are spaced from the top of the main body 140 by the second height H12 and the third height H13 respectively. When the second height H12 is slightly greater than the third height H13, the lower strap 124 is better able to pivot relative to the upper strap 122. In addition, in some embodiments, the height H11 of the first tab 134 can be slightly less than the height H11 of the second tab 136.

As illustrated, in some embodiments, the main body 140 of the lower strap 124 comprises rolled edges 154. The rolled edges 154 reduce the likelihood of the lower strap 124 scraping along a supported conduit or otherwise abrading the supported member. In addition, during installation, the rolled edges 154 allow the lower strap 124 to more easily slide along an outer surface of the supported conduit or the like without digging in or catching along the outer surface. Moreover, the rolled edges 154 also strengthen the lower strap 124 and improve its rigidity. Preferably, the edges 154 are bent to an angle α11 of about 45 degrees along substantially the entire main body 140. More preferably, the ends of the edges 154 proximate the first and second tabs 134, 136 are square because the material of the lower strap 124 is thicker than the material of the lower strap 24 described above and, therefore, the corners are more blunt in the lower strap 124 than in the lower strap 24 described above.

As with the embodiments described above, the lower strap 124 can be formed in a U-shaped configuration, a V-shaped configuration or some combination of the two. In the illustrated embodiment, the lower strap 124 is generally U-shaped. Generally U-shaped lower straps, such as the lower strap 124, are preferred for size-specific applications. For example, in some embodiments, the lower strap 124 can be sized for use with conduits or the like having an outer diameter of 2½ inches, 3 inches, 3½ inches or 4 inches. In any event, the use of a U-shaped lower strap 124 preferably, but not necessarily, corresponds to specifically sized conduits that are being supported rather than a range of sizes.

The lower strap 124 preferably comprises a pair of generally parallel leg portions 162. The first tab 134 preferably extends inward to an angle α12 relative to the corresponding leg portion 162 while the second tab 136 extends inward at an angle α13 relative to the corresponding leg portion 162. In some embodiments, the first tab 134 and the leg portion 162 define an inside angle α12 of about 140 degrees while the second tab 136 and the leg portion 162 define an inside angle α13 of about 90 degrees. In some embodiments, the first tab 134 and the leg portion 162 define an inside angle α12 of about 130 degrees. Other angles are possible.

Figure 14:
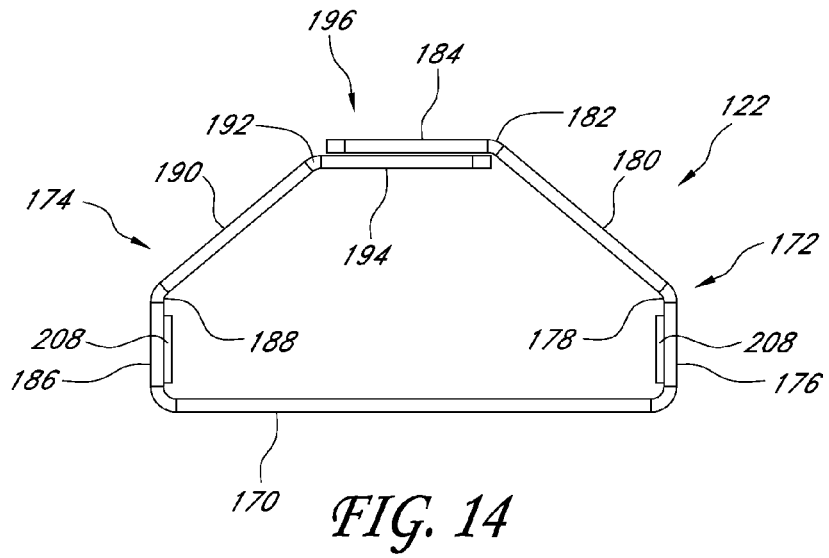
FIG. 14 is a front view of an upper strap of the embodiment of FIG. 8.
Figure 15:
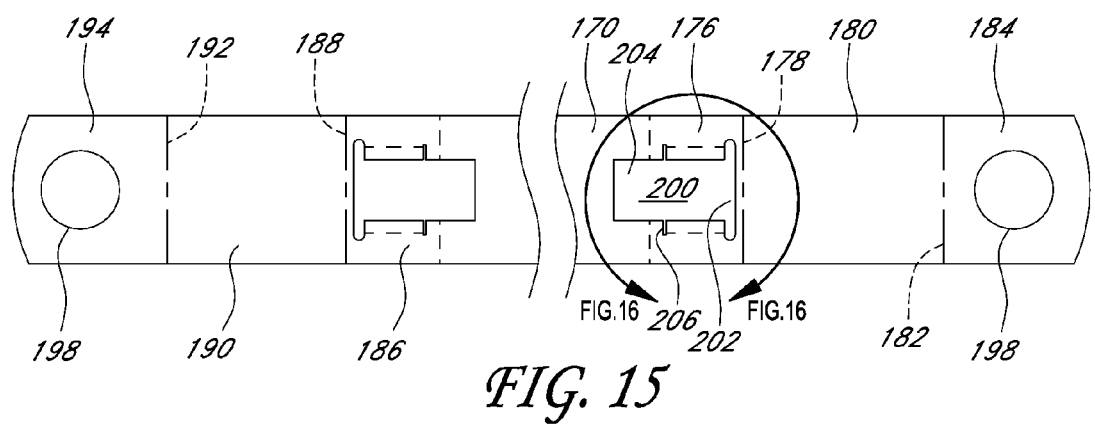
FIG. 15 is a view of the upper strap of the embodiment of FIG. 8 prior to any bending operations.
Figure 16:
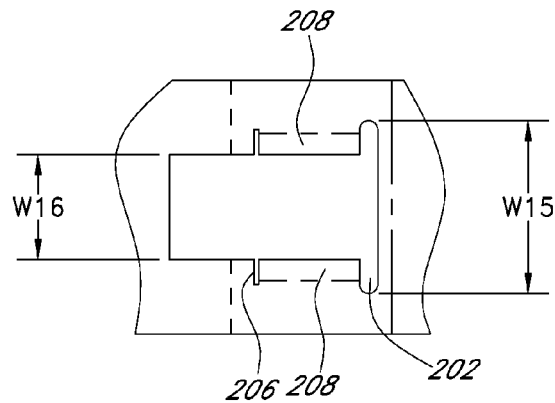
FIG. 16 is an enlarged view of taken in the area of the line FIG. 16-FIG. 16 in FIG. 15.
Figure 17:
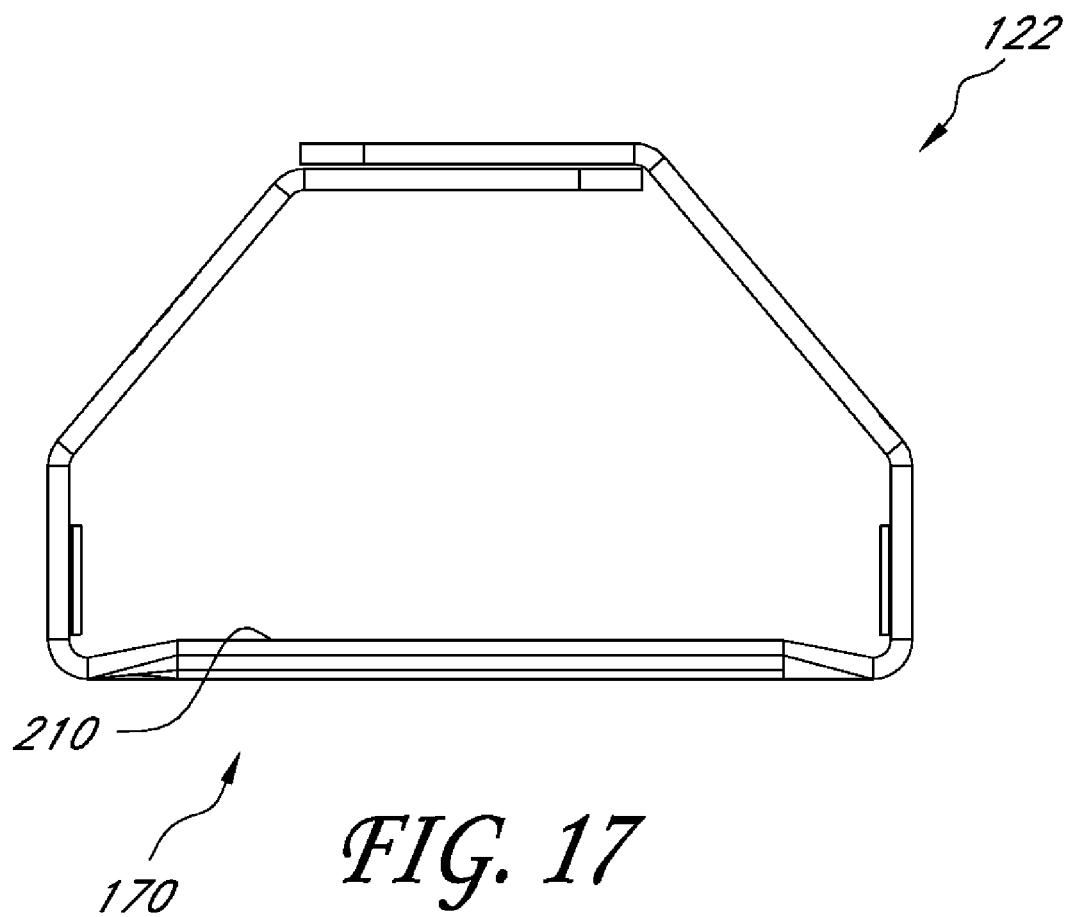
FIG. 17 is a front view of another upper strap.

With reference to FIG. 14, the illustrated upper strap 122 comprises a closed configuration. The upper strap comprises a generally horizontal lower portion 170. A first leg portion 172 and a second leg portion 174 extend upward from the lower portion 170. As illustrated, the first leg portion 172 can comprise bends in two places. For example, the first leg portion 172 comprises a lower part 176 that extends from the lower portion 170 to a first bend 178, a middle part 180 that extends from the first bend 178 to a second bend 182 and an upper part 184. Similarly, the second leg portion 174 comprises a lower part 186 that extends from the lower portion 170 to a first bend 188, a middle part 190 that extends from the first bend 188 to a second bend 192 and an upper part 194. In the illustrated configuration, an upper portion 196 is defined by at least a portion of the upper part 184 of the first leg portion 172 and at least a portion of the upper part 194 of the second leg portion. Preferably, the two upper parts 184, 194 overlap to define the upper portion 196 of the upper strap 122.

While the illustrated upper strap 122 is formed by bending operations, it is possible to form the upper strap 122 with a basic extrusion to which the openings discussed below are added. In such a closed configuration, the overlap would be eliminated. Additionally, it may be possible to secure the first and second ends of the strip used to form the upper strap 122 through welding or the like, in which case the overlap by be reduced or eliminated, if desired.

The upper portion 196 can comprise an aperture 198 or the like. Because the upper portion 196 is defined at least in part by the overlapping regions of the first leg portion 172 and the second leg portion 174, the aperture 198 preferably extends through both leg portions 172, 174. The illustrated aperture 198 is generally circular but may have other configurations. The aperture 198 can accommodate a threaded rod or the like for supporting the upper strap 122. In some configurations, a captured nut (not shown) can be provided within the aperture 198.

With reference to the detailed illustration (i.e., the view prior to performing any bending operations) of the upper strap 122, a first opening 200 preferably is formed in the lower part 176 of the first leg portion 172 and the lower portion 170. In other words, a portion of the first opening 200 extends across a bend that connects the lower portion 170 to the first leg portion 172.

As illustrated, the first opening 200 preferably is generally T-shaped in configuration. A head portion 202 of the opening 200 is positioned between a post portion 204 of the opening 200 and the aperture 198. In other words, the head portion 202 is positioned toward the closest end of the unbent upper strap 122 relative to the post portion 204. In addition, the post portion 204 preferably is the portion of the opening 200 that bridges the bend formed between the lower portion 170 and the first leg portion 172.

Moreover, in the illustrated configuration, a slot 206 extends across a portion of the post portion 204. Preferably, the slot 206 is positioned in the lower part 176 of the unbent upper strap 122 along with the head portion 202 of the opening 200. More preferably, the slot 206 is positioned closer to the bend between the lower portion 170 and the lower part 176 of the first leg portion 172 than the head portion 202. The slot 206 allows two wings 208 to be formed along a portion of the post portion 204. The wings 208 can be formed by coining, bending or the like. As shown, the wings 208 preferably extend inward toward a center of the formed upper strap 122.

In some embodiments (see FIG. 17), the upper strap 122 can comprise at least two rolled edges 210. The rolled edges 210 can be formed along the lower portion 170. The rolled edges 210 improve the strength and rigidity of the lower portion 170. In some embodiments, rolled edges also can be formed along other portions of the upper strap 122. In the illustrated embodiment, the rolled edges 210 extend upward and reduce the likelihood of bending occurring along the lower portion 170.

In the illustrated configuration, the head portion 202 of the first opening 200 defines an inside width W15 that is slightly larger than the width W11 of the first tab 134 while the post portion 204 defines an inside width W16 that is slightly larger than the width W12 of the neck region 146 of the first tab 134. Advantageously, in some embodiments, a distance from one side of the neck region 146 to the opposite outside edge of the tab 134 is at least the same, if not larger, than a distance from the inside edge of the slot 206 and the inside edge of the opposite wing 208 such that, if the tab 134 were fully moved to one side of the opening 200, the neck region 146 would contact the inside edge of the slot 206 and the opposite wing 208 would still overlie the other side of the tab 134.

In some embodiments, a distance from the inside of one leg portion 162 to the top of the tab 136 that forms a generally right angle with the other leg portion 162 is generally the same if not less than an inside distance from the lower part 176 of the first leg portion 172 to the lower part 186 of the second leg portion 174. In such embodiments, with the first tab 134 inserted into the first opening 202 and moved fully toward a second opening 212, the second tab 136 can be moved into position adjacent to a head portion 214 of the second opening before be pressed inward to move the neck region 148 over the wings 208, which allows the tab 136 to be moved downward along a post portion 216 of the second opening 212. Releasing a compressive force exerted between the two leg portions 162 allows the lower strap 124 to spring open into position with the first tab 134 positioned within the first opening 200 and the second tab 136 positioned within the second opening 212.

In use, the upper strap 122 can be secured in position along a threaded rod or the like using nuts or the like. With the upper strap 122 secured in position, the first tab 134 can be inserted into the head portion 202 of the first opening 200. The first tab 134 is fully inserted such that the recesses 142 that define the neck region 146 are positioned over the wings 208. At this point, the first tab 134 can the rest of the lower strap 122 can be moved downward until the first tab 134 is resting of the lower portion 170. The lower strap 122 is capable of pivotal movement relative to the upper strap 122. Thus, the lower strap 122 can easily receive the conduit, pipe or the like that is going to be supported. With the component that is going to be supported loaded into the lower strap 122, the lower strap 122 can be pivoted upward until the second tab 136 is generally aligned with the head portion 214 of the second opening 212. The leg portions 162 of the lower strap can be compressed together until the recesses 144 that define the neck region 148 of the second tab 136 are generally aligned with wings 218 of the second opening 212. When alignment has been achieved, the second tab 136 can be moved downward through the post portion 216 of the second opening 212. When the leg portions 162 of the lower strap 122 are released and the second tab 136 is generally adjacent to the lower portion 170, the leg portions 162 move apart from each other. The first tab 134 preferably is positioned below the wings 208 of the first opening 200 while the second tab 136 preferably is positioned below the wings 218 of the second opening 212. Moreover, the bottom of the first tab 134 is forced against the inside of the upper strap 122 and the bottom of the second tab 136 is forced against the inside of the upper strap 122. Thus, the lower strap 124 is secured in position within the upper strap 122.

Figure 18:
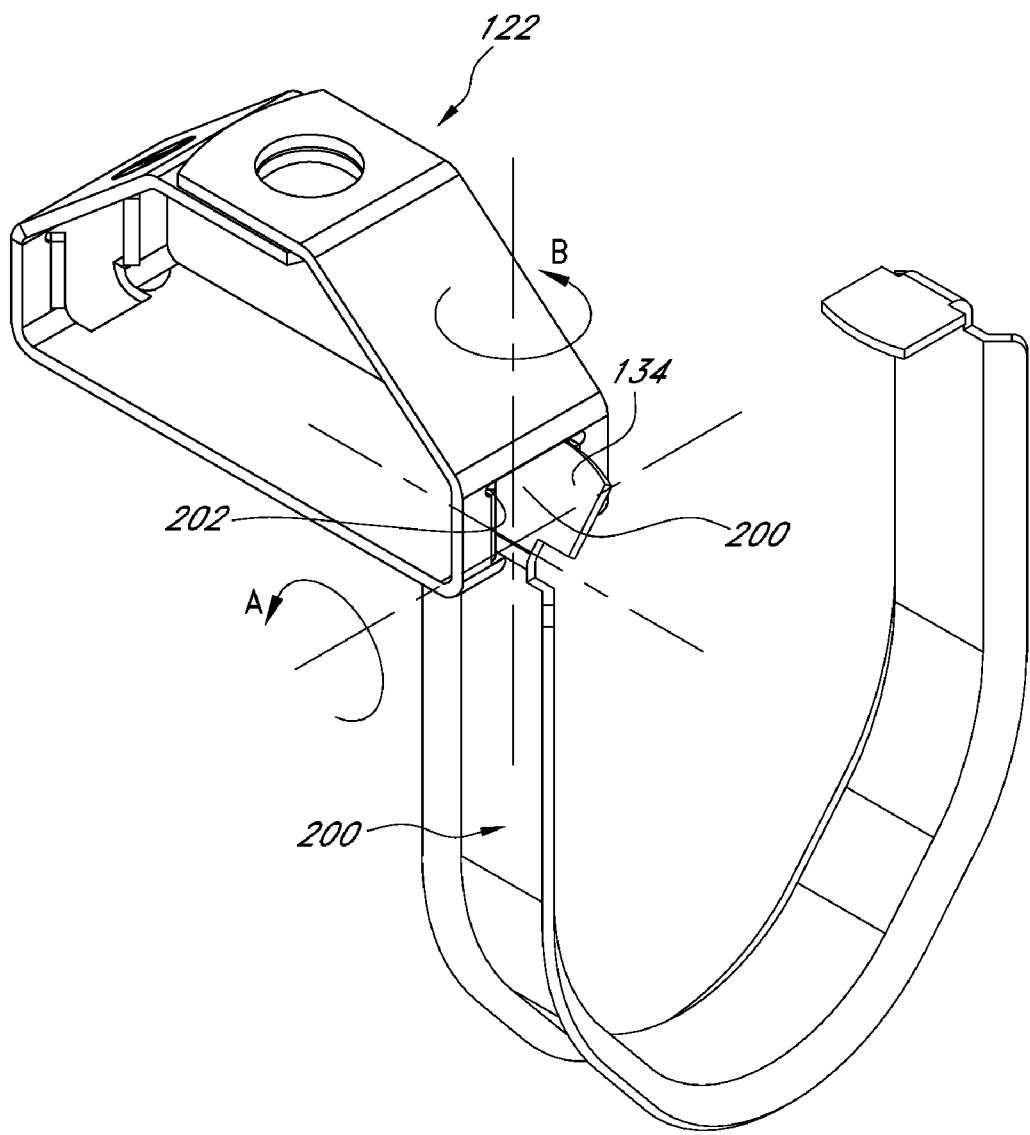
FIG. 18 illustrates a step in assembling a lower strap to an upper strap where a tab of the lower strap has a width greater than a width of an upper portion of an opening of the upper strap.

With reference to FIG. 18. in some embodiments, the outside width of the first tab 134 can be larger than the width of the head portion 202 of the first opening 200. In such embodiments, the tab 134 is positioned with an outside edge generally perpendicular to the opening 200 and with the tab 134 extending from one side to the other diagonally within the opening 200. With such an initial position, the tab 134 can be pivoted into position with the tab 134 fully passing through the opening 200. In general, the tab 134 first is pivoted as shown by A and then is pivoted as shown by B. Such a configuration decreases the likelihood of the tab 134 falling out of the opening 200 and, therefore, improves the performance of the strap.

Figure 19:
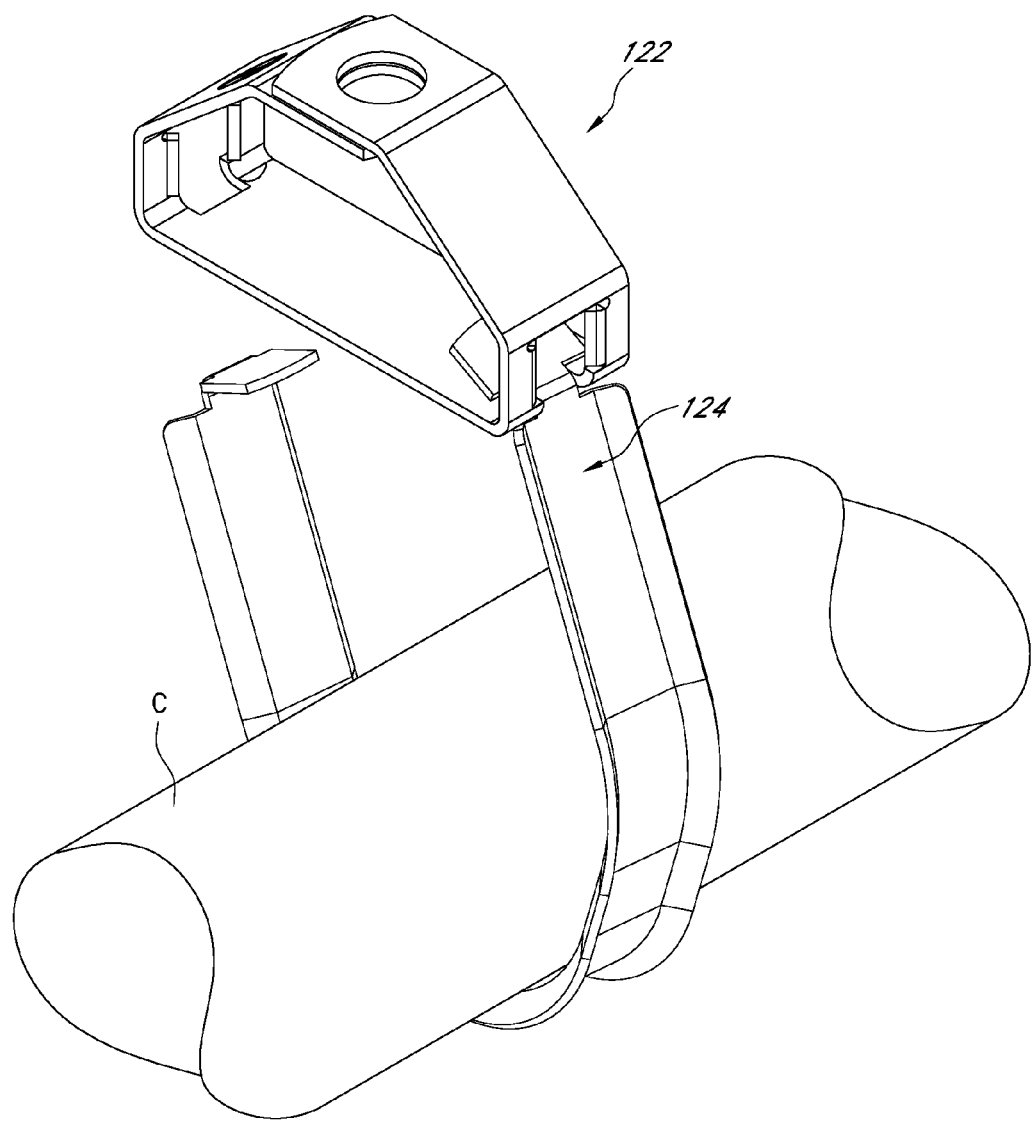
FIG. 19 illustrates a clevis hanger with a lower strap connected at only one end to an upper strap such that the lower strap can pivot between an open position and a closed position for insertion of a conduit.
Figure 20:
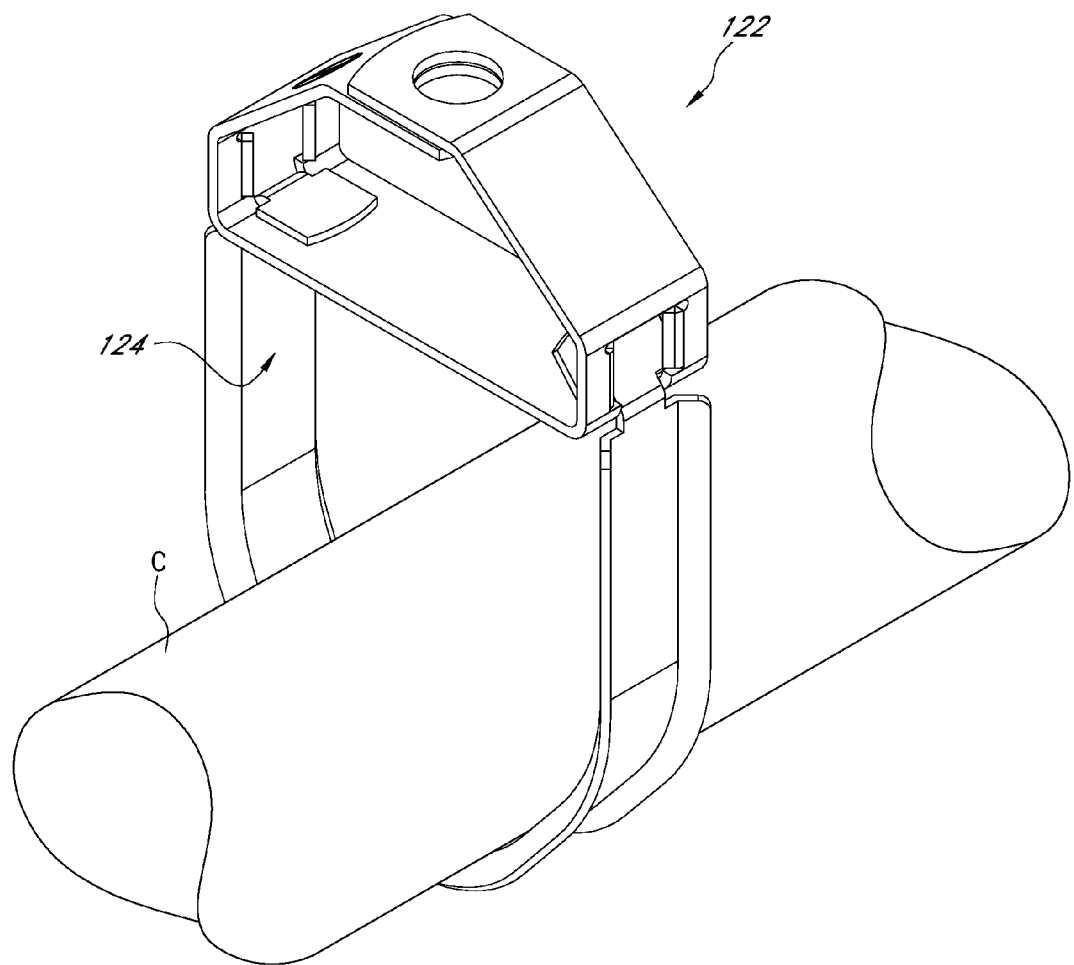
FIG. 20 illustrates the clevis hanger of FIG. 19 in the closed position.

With reference to FIGS. 19 and 20, the snap-closed feature is shown in more detail. In the illustrated configuration, the threaded rod that will support the upper strap 122 is omitted for clarity. Note, however, that the upper strap 122 typically is supported by a threaded rod and a nut, for example. As shown, the lower strap 124 can be pivotally supported by the upper strap 122. With the lower strap 124 pivotally supported by the upper strap 122, the lower strap 124 can support a conduit C. With the conduit C supported, the lower strap 124 can be pivoted upward and snapped closed as discussed above. The snapped closed position of an embodiment of the clevis hanger 120 is shown in FIG. 20.

Although the present invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, while the illustrated embodiments have featured tabs on the lower strap and holes in the upper strap, it may be possible to use holes on the lower strap and tabs on the upper strap or a hole and a tab on the upper strap and a hole and a tab on the lower strap. In addition, while a number of variations of the embodiments of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made in further embodiments and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A clevis hanger comprising:
   a lower strap comprising a first end and a second end, said first end comprising a first tab and said second end comprising a second tab, a main body being positioned between said first tab and said second tab, said main body comprising a bent lower portion and a pair of generally parallel arms extending upward from said bent lower portion, said pair of generally parallel arms comprising a first arm and a second arm, said first arm being separated from said first tab by a first neck region defined by at least one recess and said second arm being separated from said second tab by a second neck region defined by at least one recess, said lower strap being generally symmetrical about a transverse generally vertical center plane;
   an upper strap comprising a pair of leg portions, said leg portions being spaced apart and being generally symmetrical about the transverse generally vertical plane, said leg portions comprising a first leg portion and a second leg portion, said first leg portion comprising a first two part opening and said second leg portion comprising a second two part opening, said first tab being receivable within said first two part opening and said second tab being receivable within said second two part opening;
   wherein said upper strap comprises an opened configuration;
   wherein said upper strap comprises an upper portion, said first leg extending downward from said upper portion and said first leg having an upper part that extends from said upper portion of said upper strap, a middle part that extends from a first bend between said upper part and said upper portion to a second bend between said middle part and a lower part, said first two part opening extending from said middle part to said lower part and traversing said second bend line.

2. The clevis hanger of claim 1, wherein said lower part of said first leg portion is generally parallel to said upper portion of said upper strap.

3. The clevis hanger of claim 1, wherein said first two part opening comprises a T-shaped configuration, said T-shaped configuration comprising a head portion and a post portion, said post portion extending from said middle part to said lower part and traversing said second bend line.

4. A clevis hanger comprising:
   a lower strap comprising a first end and a second end, said first end comprising a first tab and said, second end comprising a second tab, a main body being positioned between said first tab and said second tab, said main body comprising a bent lower portion and a pair of generally parallel arms extending upward from said bent lower portion, said pair of generally parallel arms comprising a first arm and a second arm, said first arm being separated from said first tab by a first neck region defined by at least one recess and said second arm being separated from said second tab by a second neck region defined by at least one recess, said lower strap being generally symmetrical about a transverse generally vertical center plane;
   an upper strap comprising a pair of leg portions, said leg portions being spaced apart and being generally symmetrical about the transverse generally vertical plane, said leg portions comprising a first leg portion and a second leg portion, said first leg portion comprising a first two part opening and said second leg portion comprising a second two part opening, said first tab being receivable within said first two part opening and said second tab being receivable within said second two part opening;
   wherein the upper strap comprises a closed configuration;
   wherein said upper strap comprises a lower portion, said first leg portion extending upward from said lower portion and said second leg portion extending upward from said lower portion;
   wherein at least a portion of said first leg portion overlaps with at least a portion of said second leg portion and an aperture being defined through both of said first and second leg portions in the overlapping portions.

5. The clevis hanger of claim 4, wherein said first two part opening extends into said lower portion and said second two part opening extends into said lower portion.

6. The clevis hanger of claim 4, wherein said lower portion comprises at least one rolled edge.

7. A clevis hanger comprising:
   a lower strap comprising a first end and a second end, said first end comprising a first tab and said second end comprising a second tab, a main body being positioned between said first tab and said second tab, said main body comprising a bent lower portion and a pair of generally parallel arms extending upward from said bent lower portion, said pair of generally parallel arms comprising a first arm and a second arm, said first arm being separated from said first tab by a first neck region defined by at least one recess and said second arm being separated from said second tab by a second neck region defined by at least one recess, said lower strap being generally symmetrical about a transverse generally vertical center plane;

an upper strap comprising a pair of leg portions, said leg portions being spaced apart and being generally symmetrical about the transverse generally vertical plane, said leg portions comprising a first leg portion and a second leg portion, said first leg portion comprising a first two part opening and said second leg portion comprising a second two part opening, said first tab being receivable within said first two part opening and said second tab being receivable within said second two part opening;

wherein said first two part opening comprises a head portion and a post portion with said post portion comprising a pair of wings that extends alongside at least a portion of said post portion.

* * * * *